Sept. 4, 1962 S. M. FREY 3,052,496
FLIPPER ROOF PANEL
Filed Nov. 23, 1960 3 Sheets-Sheet 2

STUART M. FREY
INVENTOR.

BY John R. Faulkner
John J. Roethel

ATTORNEYS

Sept. 4, 1962 S. M. FREY 3,052,496
FLIPPER ROOF PANEL
Filed Nov. 23, 1960 3 Sheets-Sheet 3

STUART M. FREY
INVENTOR.

BY John R. Faulkner
John J. Roethel
ATTORNEYS

United States Patent Office 3,052,496
Patented Sept. 4, 1962

3,052,496
FLIPPER ROOF PANEL
Stuart M. Frey, Detroit, Mich., assignor to Ford Motor Company, Dearborn, Mich., a corporation of Delaware
Filed Nov. 23, 1960, Ser. No. 71,319
7 Claims. (Cl. 296—44)

This invention relates to motor vehicles and more particularly to a flipper roof panel for such vehicles.

The current trend toward lower body silhouettes and roof levels in motor vehicles has made ingress and egress of the passengers to and from the vehicle interior increasingly difficult. To offset the effect of the low roof in present day vehicles it has been proposed to increase the effective area of the door opening by providing a movable roof panel which will automatically swing open concurrently with opening of the door. Such devices generally fall into two categories; those having a motor operated panel actuated upon opening and closing of the door and those in which the movement of the panel is controlled by a linkage system actuated by movement of the door. Neither type of device has enjoyed extensive acceptance in motor vehicles. The mechanisms of the former category present a disadvantage in that they are expensive and subject to mechanical failures because of their complexity. The latter type of mechanisms also present certain undesirable features. They for the most part, contain numerous pivotally connected links interconnecting the door and roof panel for conjoint movement. These links and their pivotal connections are normally concealed within the enclosed portions of the body structure and fail to provide any way in which the pivotal connections may be lubricated. The use of the positive mechanical connection between the door and roof panel also makes it impossible to operate the door should one of these pivotal connections "freeze" due to the lack of lubrication, or should the panel fail to operate for some other reason.

An object of this invention, therefore, is to provide a flipper roof panel operated by opening and closing of the vehicle door to facilitate ingress and egress to and from the vehicle interior. It is a further object of this invention to provide an actuating mechanism for the flipper panel that does not depend on an electric or fluid motor for its operation. It is a still further object of this invention to provide a mechanical actuator for the flipper panel utilizing a minimum number of links and pivotal connections and one which will allow the door to be opened and closed should the panel in some way become frozen in any position.

This invention provides a flipper roof panel which is normally biassed into its open position. An actuating mechanism for the panel is provided that includes a lever pivoted to the body in the area adjacent the door hinges. This lever is connected to operate the roof panel by means of a flexible cable. The lever is not interconnected in any way to the door but is operated to close the panel against the action of the biassing means solely upon contact with the door. Further mechanism is provided whereby the vehicle occupant may lock the panel in its closed position.

In an embodiment of this invention the flipper panel is hinged to the vehicle roof by a hinge formed of an elastically deformable member which also serves as a weather-strip between the roof and flipper panel. This hinge structure is constructed so that the elastic material is subjected only to torsional stresses.

Further objects and advantages of this invention will become more apparent as this description proceeds, particularly when considered in conjunction with the accompanying drawings in which.

Figure 1:
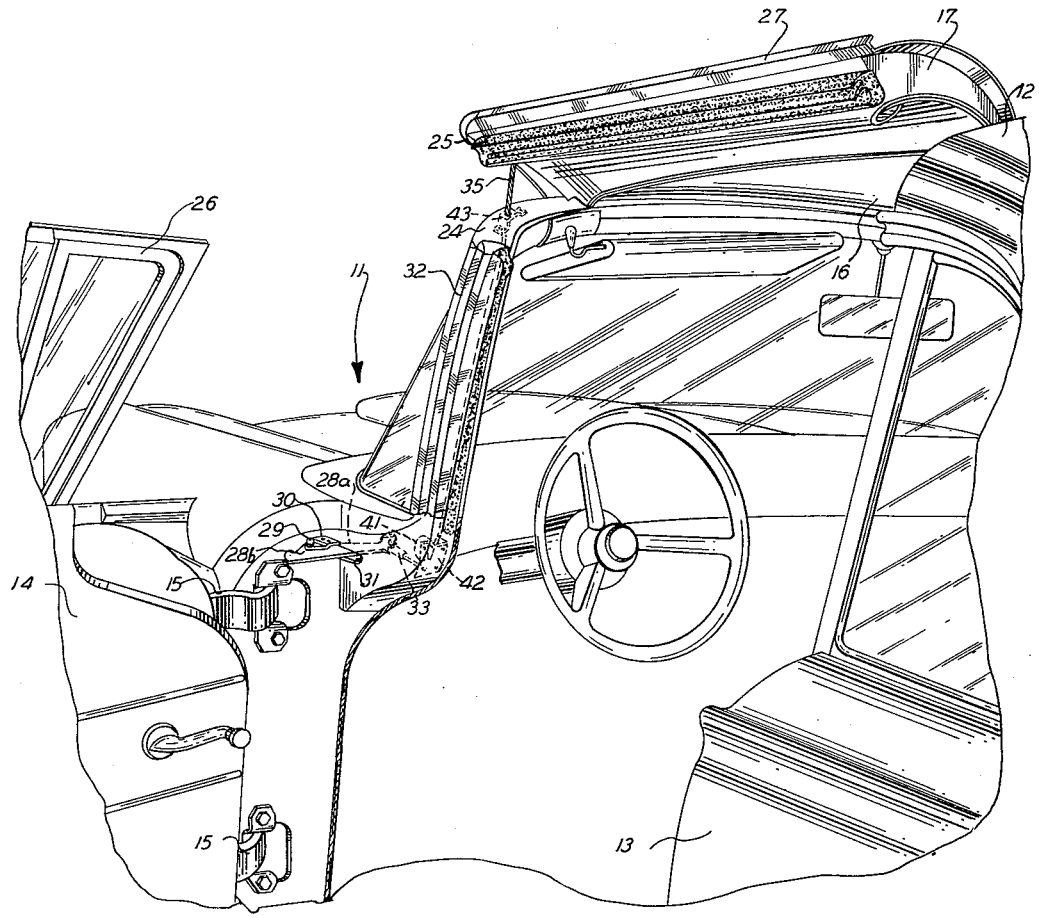
FIGURE 1 is a perspective view of a portion of a motor vehicle incorporating this invention.
Figure 2:
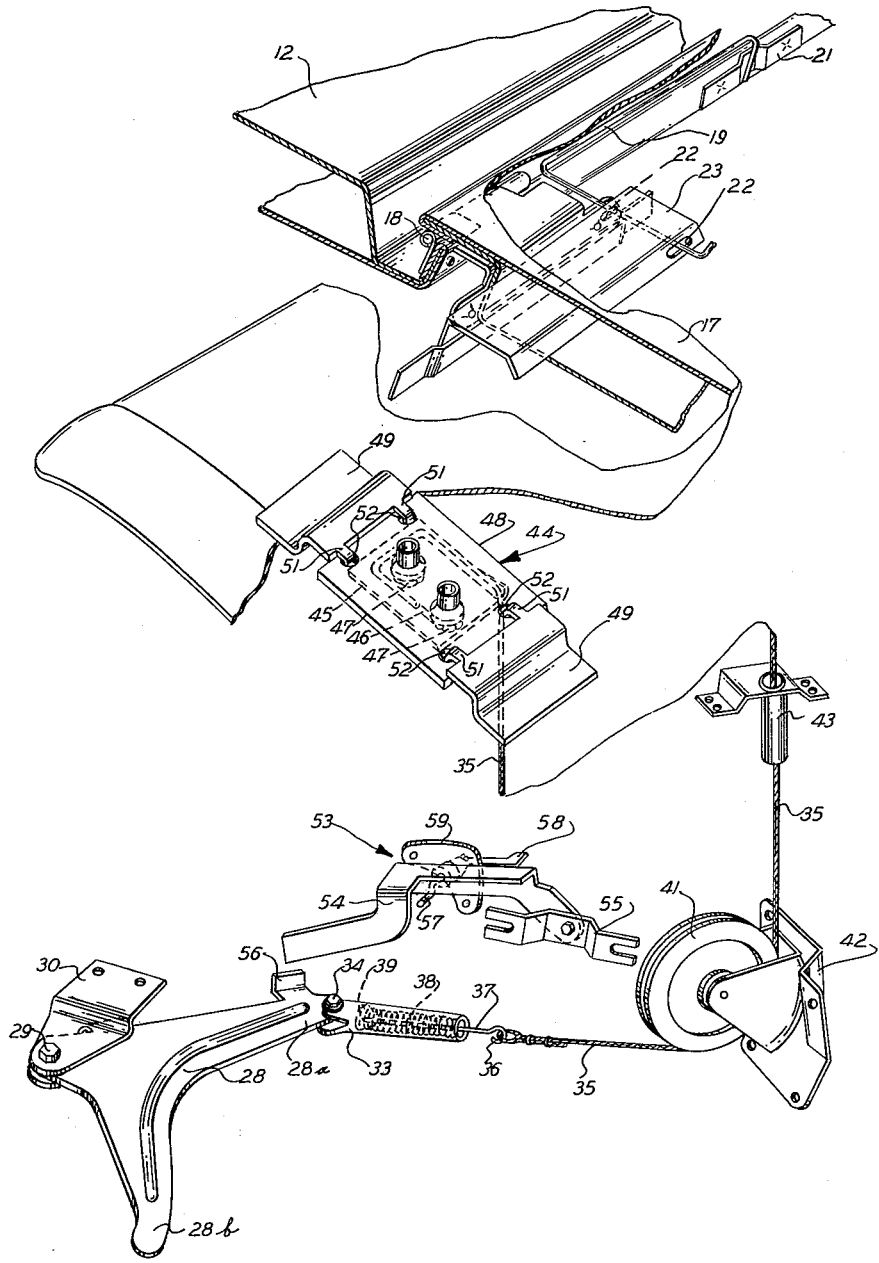
FIGURE 2 is a perspective view similar to FIGURE 1 taken from another angle and having portions broken away to more clearly show the construction.

Referring now to the drawings and in particular to the embodiment of FIGURES 1 and 2, there is shown generally at 11 a motor vehicle having converging roof and side portions 12 and 13 respectively. A door 14 is hinged at 15 to the body side portion 13 in a conventional manner.

An opening 16 is provided in the roof portion adjacent the area occupied by the door 14 when in its closed position. This opening is of a suitable width to allow freedom of ingress and egress to and from the vehicle interior when the door is open. Preferably this opening extends for a length equal to the width of the door opening. A closure member or flipper roof panel 17 is provided for opening 16. Flipper panel 17 is connected to roof portion 12 for swinging movement by conventional strap hinges 18, only one of which is shown. Flipper panel 17 is normally biassed into its open position by the action of a torsion bar 19. One end of the torsion bar 19 is secured relative to roof portion 12 by bracket 21 which is welded or otherwise suitably secured to the roof portion 12. The other end of the torsion bar 19 passes through slots 22 formed in bracket 23 which bracket is secured to the enclosed area of flipper panel 17. As has been noted, the action of the torsion bar 19 is such that it normally urges panel 17 into the open position shown in FIGURE 1. Panel 17 when in its open position clears opening 16 and allows free ingress and egress to and from the vehicle interior.

Panel 17 when in its closed position is flush with the surface of roof 12. Weatherstrip material (not shown) is provided between flipper panel 17 and the adjacent surfaces of the windshield header 24 and roof 12 to provide a seal in these areas. Weatherstrip material 25 is provided which coacts with the window frame 26 of the door 14 to provide a seal therewith when the flipper panel 17 and door 14 are in the closed position. A rain gutter 27 is suitably secured to flipper panel 17. Thus it may be seen that the flipper panel 17 when in its closed position forms a weather tight closure with the remainder of the vehicle body and also occupies the same position as would the conventional vehicle roof. Because panel 17 has the same physical location as the corresponding section of the conventional roof, door 14 may be opened or closed irrespective of the position of the flipper panel 17.

The actuating mechanism for closing the flipper panel 17 includes a bell crank or lever 28 pivotally supported by pin 29 in bracket 30. Bracket 30 is suitably bolted or otherwise secured to the body side 13 adjacent the area where the door 14 is hinged. One arm 28a of the bell crank 28 extends through slot 31 formed in the outer side body panel 13. Enclosed within the front pillar 32 extending between the cowl and roof is a tubular retaining member 33. This member is pivotally connected to bell crank 28 by pin 34. Motion is transmitted to panel 17 from bell crank 28 and retainer member 33 by means of flexible cable 35. One end of the flexible cable 35 is secured to a hook 36 formed on the end of the rod 37. Rod 37 extends into retaining member 33 and is held in the retaining member by the action of coil spring 38 on the enlarged end 39 of the rod. Flexible cable 35 passes around pulley 41, preferably formed of nylon, the bracket 42 of which is secured as by screws (not shown) to the enclosed portion of the body structure at the base of the front pillar 32. Cable 35 passes through the interior of the front pillar 32 and extends through a guide 43, preferably formed of "Teflon," secured to the top of windshield header 24. At its upper end cable 35 is secured to flipper panel 17 by the bracket assembly generally indicated at 44. Bracket assembly 44 includes a plate 45 having a groove 46 formed therein. Groove 46 receives the end of cable 35 and is of a lesser depth than the diameter of the cable. Plate 45 and cable 35 therewith are secured to flipper panel 17 by means of bolts 47 received in threaded holes formed in plate 48. Plate 48 is secured in the enclosed area of flipper panel 17 by retainer member 49 having projections 51 which coact with holes 52 formed in plate 48. Retainer members 49 are suitably secured to the flipper panel 17, as by welding. Tightening bolts 47 compresses cable 35 in groove 46 holding it securely in place.

A locking mechanism, generally indicated at 53, is provided to enable the vehicle occupant to lock the flipper panel 17 in its closed position. The locking assembly 53 includes a lever 54 pivotally supported by bracket 55 secured to the enclosed portion of the body structure in the area near the base of the front pillar 32. The end of lever 54 can coact with the upstanding projection 56 formed on bell crank 28 to lock panel 17 in its closed position in a manner which will be made more apparent as this description proceeds. The position of lever 54 is controlled by rod 57 mounted to the actuated by lever 58 which extends into the vehicle interior. Rod 57 is pivotally supported by bracket 59 suitably secured to the body portion in the vehicle interior.

*Operation*

With the door in the open position, shown in FIGURE 1, the torsion bar 19 holds flipper panel 17 open to allow free ingress and egress to and from the vehicle interior. Closing movement of the door 14 brings the door into abutting relation with the end 28b of bell crank 28. Further movement of the door 14 causes the bell crank 28 to pivot about pin 29. Pivotal movement of bell crank 28 causes cable 35 to be drawn downward through guide 43. This movement of the cable swings the flipper panel 17 about hinges 18 into the closed position. It should be noted that spring 38 is sufficiently rigid so as not to yield during this movement. Should the panel 17, however, bind in the open or partially open position, spring 38 will yield allowing retainer member 33 to move relative to rod 37. Thus the door 14 may be closed even though panel 17 fails to operate.

The system is constructed so that panel 17 is completely closed before the door 14 is fully shut. To allow the door to be fully closed spring 38 will yield thus allowing the necessary further pivotal movement of bell crank 28. When the door 14 is again opened freeing bell crank 28 for movement, torsion bar 19 causes flipper panel 17 to assume its open position. It can be seen that the provision of torsion bar 19 obviates the need of any positive linkage to open the panel. Because no linkage positively connects door 14 and panel 17, the door may be opened in a normal manner should the flipper panel 17 somehow bind in the closed position.

If it is desired to lock the flipper panel 17 in the closed position, lever 58 may be rotated pivoting lever 54 into registry with the projection 56 of bell crank 28. When this is done the action of torsion bar 19 is resisted upon opening of door 14 even though bell crank 28 is free from action of the door and flipper panel 17 will be locked in the closed position.

Figure 3:
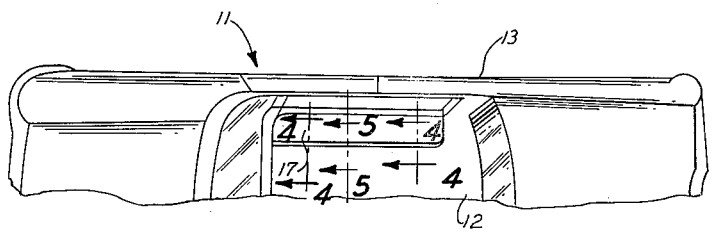
FIGURE 3 is a top plan view of a portion of a motor vehicle incorporating another embodiment of this invention.
Figure 4:
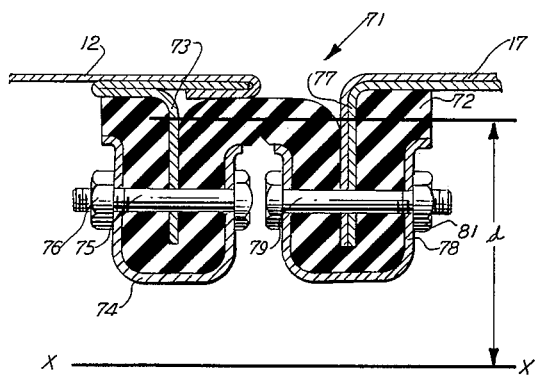
FIGURE 4 is a cross sectional view taken along lines 4—4 of FIGURE 3.
Figure 5:
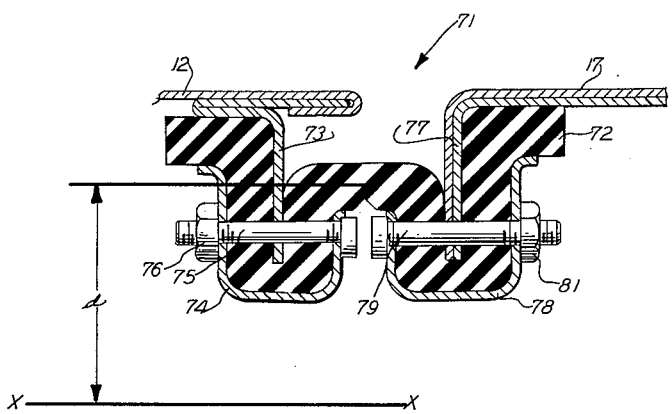
FIGURE 5 is a cross sectional view taken along line 5—5 of FIGURE 3.

In the embodiment of FIGURES 3–5 the panel structure and its actuating mechanism are the same as that previously described and reference may be had to that description for the details of these components. In this embodiment the use of strap hinges and separate weatherstrip material is eliminated by utilizing a flexible hinge, generally indicated at 71. This hinge includes an elastically deformable body 72, formed of rubber or other similar material. One end of the hinge body 72 is secured to the roof extension 73 by means of U-shaped sheet metal retainer 74, bolts 75 and nuts 76. The other end of body 72 is secured to the extension 77 of flipper panel 17 by the U-shaped sheet metal retainer 78, bolts 79 and nuts 81. Body 72 is sufficiently resilient to allow the swinging action of panel 17 between the open and closed positions and also serves satisfactorily as a weatherstrip between this panel and the adjacent roof surface.

The roof line of motor vehicles is not planar but rather is a longitudinally curved surface. This may be seen from the FIGURES 4 and 5 cross sections taken at different places along the length of the roof line. Because of this curvature, points along the length of the adjacent edge portions of roof 12 and flipper panel 17 lie at varying distances from a fixed horizontal reference plane indicated by the line X—X. Should the line of action about which the body 72 flexes also not be a straight line, this body would be subjected to sheer as well as torsional stresses. This would result in premature failure of the hinge. To insure that the line of action of body 72 is a straight line parallel to horizontal reference plane X—X at a fixed distance $d$ above the plane, U-shaped retainer members 74 and 78 are formed of varying depth so that a portion of body 72 extends between the roof 12 and panel 17 with its upper surface parallel to the reference plane X—X. In this way the line of action of the hinge and the axis about which flipper panel 17 pivots coincide.

It is to be understood that, although a structure for only one door has been described, similar structures are used at the door on each side of the vehicle or on all doors of a four-door vehicle.

It will be understood that the invention is not to be limited to the exact construction shown and described, but that various changes and modifications may be made without departing from the spirit and scope of the invention, as defined in the appended claims.

I claim:

1. A motor vehicle comprising connecting roof and side portions, a door supported by said side portion for swinging movement from an open to a closed position, said roof portion defining an opening therein adjacent said door when the latter is in its closed position, a closure member, said closure member and said roof portion having adjacent edge portions the loci of which lie at varying distances from a fixed horizontal reference plane, a body of elastically deformable material, means securing said body at each end thereof to said roof portion and said closure member to provide a hinge therebetween whereby said closure member may swing from an open position to a closed position in which it occupies said roof opening, said last named means being constructed and arranged so that a portion of said body extends between said members and said roof portion and is substantially parallel to said reference plane whereby swinging movement of said closure member subjects said body only to torsional stresses, means operative to bias said closure member into its open position, means constructed and arranged to move said closure member into its closed position upon swinging movement of said door into its closed position, and means selectively actuatable to lock said closure member in its closed position.

2. A motor vehicle comprising connecting roof and side portions, a door supported by said side portion for swinging movement from an open to a closed position, said vehicle roof portion defining an opening therein adjacent said door when the latter is in its closed position, a closure member, said closure member and said roof portion having adjacent edge portions the loci of which lie at varying distances from a fixed horizontal reference plane, a body of elastically deformable material, means securing said body at each end thereof to said roof portion and said closure member to provide a hinge therebetween whereby said closure member may swing from an open position to a closed position in which said closure member occupies said roof opening, said last named means being constructed and arranged so that a portion of said elastic body extends between said roof portion and said closure member and is substantially parallel to said reference plane whereby swinging movement of said closure member subjects said elastic body only to torsional stresses, means operative to bias said closure member into its open position, lever means constructed and arranged to be actuated upon contact with said door upon swinging movement thereof into its closed position, a flexible member operatively connecting said lever means and said closure member whereby said closure member is moved into its closed position upon actuation of said lever by said door, and means selectively actuatable to lock said closure member in its closed position.

3. A motor vehicle comprising connecting roof and side portions, a door, hinge means supporting said door from said side portion for swinging movement from an open to a closed position, said vehicle roof portion defining an opening therein adjacent said door when the latter is in its closed position, a closure member supported by said roof portion for swinging movement from an open position to a closed position wherein said closure member occupies said roof opening, means operative to bias said closure member into its open position, lever means pivotally connected to said body side portion in the area adjacent said hinge means, said lever means being constructed and arranged to be pivoted upon contact with said door upon swinging movement thereof to its closed position, a flexible member operatively connecting said lever means and said closure member whereby said closure member is moved to its closed position upon pivotal movement of said lever by said door, and means selectively actuatable to lock said closure member in its closed position.

4. In combination, a pair of members to be hinged together for relative swinging movement along adjacent edge portions, said edge portions being nonlinear and spaced from a fixed reference plane, a body of elastically deformable material, and means operatively connecting each end of said body to each of said members, said last named means being constructed and arranged so that a portion of said body extends between said members and is substantially parallel to said reference plane whereby relative swinging movement of said members subjects said body only to torsional stresses.

5. In combination, a pair of members to be hinged together for relative swinging movement about an axis substantially parallel to a fixed reference plane, each of said members having adjacent edge portions, the loci of which lie at varying distances from said fixed reference plane, a body of elastically deformable material, and means securing said body at each end thereof to each of said members, said last named means being constructed and arranged so that a portion of said body extends between said members, said body portion defining a line of action which constitutes said swinging axis whereby relative swinging movement of said members subjects said body portion only to torsional stresses.

6. In combination, a pair of members to be hinged along adjacent edge portions for swinging movement of one of said members relative to the other, each of said members having a projection formed thereon contiguous to its adjacent edge portion, the ends of said projections being nonlinear and spaced at varying distances from a fixed reference plane, an elastically deformable body extending between said members and having each of its end portions extending along the respective projections of said members contiguous thereto, U-shaped retainer members surrounding each of said projections and the respective end portion of said elastically deformable body, and means securing the respective end portions of said elastic body, said retainer member, and said projection together whereby said elastic body serves as a hinge between said members, said U-shaped retainer members having varying depth corresponding to the nonlinear shape of said ends of said projections whereby the portion of said elastic body extending between said members lies at a fixed distance from and substantially parallel to said reference plane.

7. In combination, a pair of members to be hinged along adjacent elongated edge portions for swinging movement of one of said members relative to the other, each of the said members having a projection formed thereon contiguous to its adjacent edge portion the ends of said projections being nonlinear and spaced at varying distances from a fixed reference plane, said projections extending for a length substantially equal to the length of said edge portion, an elastically deformable body extending between said members and having each of its end portions extending along the respective projections of said members contiguous thereto, said end portions extending along said projection for a distance substantially equal to the length thereof, U-shaped retainer members surrounding each of said projections and the respective end portion of said elastically deformable body extending substantially along the length thereof, and means securing the respective end portions of said elastic body, said retainer member and said projection together whereby said elastic body serves as a hinge between said members said U-shaped retainer members having varying depth corresponding to the nonlinear shape of said ends of said projections whereby the portion of said elastic body extending between said members lies at a fixed distance from and substantially parallel to said reference plane.

References Cited in the file of this patent

UNITED STATES PATENTS

| | | |
|---|---|---|
| 2,499,749 | Hilliard | Mar. 7, 1950 |
| 2,607,411 | Van Vliet | Aug. 19, 1952 |
| 2,689,766 | Blackman | Sept. 21, 1954 |
| 2,857,198 | Himka | Oct. 21, 1958 |
| 2,938,749 | Podolan | May 31, 1960 |
| 2,973,221 | Blackman | Feb. 28, 1961 |